(12) United States Patent
Shears et al.

(10) Patent No.: US 7,281,525 B2
(45) Date of Patent: Oct. 16, 2007

(54) FILTER CANISTER FAMILY

(75) Inventors: Peter D. Shears, Wauwatosa, WI (US); Wayne L. Dombeck, New Berlin, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 83 days.

(21) Appl. No.: 11/362,885

(22) Filed: Feb. 27, 2006

(65) Prior Publication Data

US 2007/0199547 A1   Aug. 30, 2007

(51) Int. Cl.
*F02M 33/02* (2006.01)
(52) U.S. Cl. .................. 123/518; 123/519; 96/131
(58) Field of Classification Search .............. 123/516, 123/518, 519; 96/121, 131, 133
See application file for complete search history.

(56) References Cited

U.S. PATENT DOCUMENTS

| | | | |
|---|---|---|---|
| 1,499,864 A | 7/1924 | Gordon | |
| 2,358,840 A | 9/1944 | Walker | |
| 2,520,124 A | 8/1950 | Chaney et al. | |
| 2,553,763 A | 5/1951 | Hammon | |
| 2,822,059 A | 2/1958 | Lunn et al. | |
| 2,966,960 A | 1/1961 | Rochlin | |
| 3,221,724 A | 12/1965 | Wentworth | |
| 3,352,294 A | 11/1967 | Biller et al. | |
| 3,368,326 A | 2/1968 | Hervert | |
| 3,372,679 A | 3/1968 | Aitken | |
| 3,391,679 A | 7/1968 | Williams et al. | |
| 3,406,501 A | 10/1968 | Watkins | |
| 3,456,635 A | 7/1969 | Hervert | |
| 3,477,210 A | 11/1969 | Hervert | |
| 3,541,765 A | 11/1970 | Adler et al. | |
| 3,572,013 A | 3/1971 | Hansen | |

(Continued)

FOREIGN PATENT DOCUMENTS

DE           4304180           8/1993

(Continued)

OTHER PUBLICATIONS

George A. Lavoie et al., "A Fuel Vapor Model (FVSMOD) for Evaporative Emissions System Design and Analysis," 1998 Society of Automotive Engineers, Inc.

(Continued)

*Primary Examiner*—Thomas Moulis
(74) *Attorney, Agent, or Firm*—Michael Best & Friedrich LLP

(57) ABSTRACT

A family of canisters that includes at least two canisters that are adapted to filter a flow of fluid from a fuel tank. Each canister includes a first portion that defines a first perimeter and a first area each common to all canisters of the family. A second portion defines a second perimeter and a second area each common to all canisters of the family. A cover portion defines a third perimeter and a third area each common to all canisters of the family. A body portion cooperates with the first portion, the second portion, and the cover portion to define an interior space having a volume, a characteristic dimension, and a characteristic length. The volume of each canister of the family is different and the ratio of the characteristic length to characteristic dimension of each of the canisters is between about 1.5 and 5.

29 Claims, 9 Drawing Sheets

U.S. PATENT DOCUMENTS

| | | | |
|---|---|---|---|
| 3,572,014 A | 3/1971 | Hansen |
| 3,610,220 A | 10/1971 | Yamada |
| 3,610,221 A | 10/1971 | Stolman |
| 3,617,034 A | 11/1971 | Skinner |
| 3,645,244 A | 2/1972 | Seyfarth |
| 3,646,731 A | 3/1972 | Hansen |
| 3,650,256 A | 3/1972 | Marshall |
| 3,665,906 A | 5/1972 | De Palma |
| 3,675,634 A | 7/1972 | Tatsutomi et al. |
| 3,678,663 A | 7/1972 | Hansen |
| 3,681,899 A | 8/1972 | Grote |
| 3,696,799 A | 10/1972 | Gauck |
| 3,721,072 A | 3/1973 | Clapham |
| 3,747,303 A | 7/1973 | Jordan |
| 3,757,753 A | 9/1973 | Hunt |
| 3,759,234 A | 9/1973 | Buckton et al |
| 3,849,093 A | 11/1974 | Konishi et al. |
| 3,913,545 A | 10/1975 | Hasse et al. |
| 3,990,419 A | 11/1976 | Itakura |
| 4,112,898 A | 9/1978 | Takimoto et al. |
| 4,127,097 A | 11/1978 | Takimoto |
| 4,175,526 A | 11/1979 | Phelan |
| 4,259,096 A | 3/1981 | Nakamura et al. |
| 4,261,717 A | 4/1981 | Belore et al. |
| 4,279,233 A | 7/1981 | Tobita et al. |
| 4,279,630 A | 7/1981 | Nakamura et al. |
| 4,280,360 A | 7/1981 | Kobayashi et al. |
| 4,375,204 A | 3/1983 | Yamamoto |
| 4,415,344 A | 11/1983 | Frost et al. |
| 4,418,662 A | 12/1983 | Engler et al. |
| 4,446,838 A | 5/1984 | Suzuki et al. |
| 4,475,522 A | 10/1984 | Oonaka |
| 4,629,479 A | 12/1986 | Cantoni |
| 4,631,077 A | 12/1986 | Spicer et al. |
| 4,631,952 A | 12/1986 | Donaghey |
| 4,658,795 A | 4/1987 | Kawashima et al. |
| 4,684,382 A | 8/1987 | Abu-Isa |
| 4,684,510 A | 8/1987 | Harkins |
| 4,705,007 A | 11/1987 | Plapp et al. |
| 4,747,388 A | 5/1988 | Tuckey |
| 4,758,460 A | 7/1988 | Spicer et al. |
| 4,852,761 A | 8/1989 | Turner et al. |
| 4,919,103 A | 4/1990 | Ishiguro et al. |
| 4,938,787 A | 7/1990 | Simmerlein-Erlbacher |
| 5,215,132 A | 6/1993 | Kobayashi |
| 5,221,573 A | 6/1993 | Baigas, Jr. |
| 5,226,397 A | 7/1993 | Zabeck et al. |
| 5,259,412 A | 11/1993 | Scott et al. |
| 5,261,439 A | 11/1993 | Harris |
| 5,301,829 A | 4/1994 | Chrisco |
| 5,313,977 A | 5/1994 | Bergsma et al. |
| 5,313,978 A | 5/1994 | Takaki |
| 5,326,514 A | 7/1994 | Linden et al. |
| 5,338,253 A | 8/1994 | Damsohn et al. |
| 5,350,444 A | 9/1994 | Gould et al. |
| 5,408,977 A | 4/1995 | Cotton |
| 5,424,036 A | 6/1995 | Ushikubo |
| 5,437,701 A | 8/1995 | Townsley |
| 5,453,118 A * | 9/1995 | Heiligman ................ 96/147 |
| 5,478,379 A | 12/1995 | Bevins |
| 5,560,345 A | 10/1996 | Geyer et al. |
| 5,562,084 A | 10/1996 | Shimamura |
| 5,566,705 A | 10/1996 | Harris |
| 5,573,811 A | 11/1996 | Townsley |
| 5,623,911 A | 4/1997 | Kiyomiya et al. |
| 5,638,786 A | 6/1997 | Gimby |
| 5,704,337 A | 1/1998 | Stratz et al. |
| 5,727,531 A | 3/1998 | Osanai |
| 5,762,692 A | 6/1998 | Dumas et al. |
| 5,798,270 A | 8/1998 | Adamczyk, Jr. et al. |
| 5,809,976 A | 9/1998 | Cook |
| 5,871,569 A | 2/1999 | Oehler et al. |
| 5,875,768 A | 3/1999 | Schenk et al. |
| 5,878,729 A | 3/1999 | Covert et al. |
| 5,891,207 A | 4/1999 | Katta |
| 5,898,107 A | 4/1999 | Schenk |
| 5,901,689 A | 5/1999 | Kimura et al. |
| 5,912,368 A | 6/1999 | Satarino et al. |
| 5,915,364 A * | 6/1999 | Katou et al. ................ 123/519 |
| 5,935,398 A | 8/1999 | Taniguchi et al. |
| 5,957,114 A | 9/1999 | Johnson et al. |
| 6,102,085 A | 8/2000 | Nanaji |
| 6,105,708 A | 8/2000 | Amano et al. |
| 6,136,075 A | 10/2000 | Bragg et al. |
| 6,152,996 A | 11/2000 | Linnersten et al. |
| 6,156,089 A | 12/2000 | Stemmer et al. |
| 6,182,693 B1 | 2/2001 | Stack et al. |
| 6,189,516 B1 | 2/2001 | Hei Ma |
| 6,231,646 B1 | 5/2001 | Schweizer et al. |
| 6,237,574 B1 | 5/2001 | Jamrog et al. |
| 6,269,802 B1 | 8/2001 | Denis et al. |
| 6,273,070 B1 | 8/2001 | Arnal et al. |
| 6,279,548 B1 * | 8/2001 | Reddy ................ 123/520 |
| 6,302,144 B1 | 10/2001 | Graham et al. |
| 6,330,879 B1 | 12/2001 | Kitamura et al. |
| 6,354,280 B1 | 3/2002 | Itakura et al. |
| 6,367,458 B1 | 4/2002 | Furusho et al. |
| 6,390,074 B1 | 5/2002 | Rothamel et al. |
| 6,395,048 B1 | 5/2002 | Yoder et al. |
| 6,425,380 B2 * | 7/2002 | Yamada et al. ............ 123/519 |
| 6,463,915 B2 | 10/2002 | Ozaki et al. |
| 6,464,761 B1 | 10/2002 | Bugli |
| 6,505,610 B2 | 1/2003 | Everingham et al. |
| 6,514,326 B1 * | 2/2003 | Hara et al. ................ 96/133 |
| 6,591,866 B2 | 7/2003 | Distelhoff et al. |
| 6,595,167 B2 | 7/2003 | Kaesgen |
| 6,675,780 B1 | 1/2004 | Wendels et al. |
| 6,692,551 B2 | 2/2004 | Wernholm et al. |
| 6,692,555 B2 | 2/2004 | Oda et al. |
| 6,699,310 B2 | 3/2004 | Oda et al. |
| 6,729,312 B2 | 5/2004 | Furushou |
| 6,729,319 B2 | 5/2004 | Mitsutani |
| 6,736,871 B1 | 5/2004 | Green et al. |
| 6,758,885 B2 | 7/2004 | Leffel et al. |
| 6,786,207 B2 | 7/2004 | Kojima et al. |
| 6,772,740 B2 | 8/2004 | Kojima et al. |
| 6,779,512 B2 | 8/2004 | Mitsutani |
| 6,863,082 B1 | 2/2005 | McIntosh et al. |
| 6,874,484 B2 | 4/2005 | Benjey |
| 6,874,485 B2 | 4/2005 | Fujimoto |
| 6,877,488 B2 | 4/2005 | Washeleski |
| 6,892,711 B2 | 5/2005 | Belanger, Jr. et al. |
| 6,955,159 B2 * | 10/2005 | Ogawa ................ 123/519 |
| 6,959,696 B2 | 11/2005 | Shears et al. |
| 6,976,477 B2 | 12/2005 | Gimby et al. |
| 7,047,952 B1 * | 5/2006 | Yamauchi et al. .......... 123/519 |
| 2003/0024397 A1 * | 2/2003 | Meiller et al. ................ 96/139 |
| 2005/0005917 A1 | 1/2005 | Veinotte |
| 2005/0178368 A1 | 8/2005 | Donahue et al. ............ 123/520 |
| 2005/0274364 A1 * | 12/2005 | Kirk et al. ................ 123/519 |
| 2005/0284450 A1 | 12/2005 | Mills |
| 2006/0065252 A1 * | 3/2006 | Meiller et al. ............ 123/519 |
| 2007/0119306 A1 * | 5/2007 | Yamada et al. ................ 96/131 |

FOREIGN PATENT DOCUMENTS

| | | |
|---|---|---|
| EP | 0 611896 | 8/1994 |
| EP | 1110593 | 6/2001 |
| GB | 2082935 | 3/1992 |

| | | |
|---|---|---|
| JP | 54141916 | 11/1979 |
| JP | 58-067960 | 4/1983 |

OTHER PUBLICATIONS

H. Bauer.-ed., "Gasoline-Engine Management," 1999, p. 152, Robert Bosch GmbH.

H. Bauer.-ed., "Gasoline Engine Management," 1999, p. 288-289, Robert Bosch GmbH.

H. Bauer.-ed., "Gasoline Engine Management," 1999, pp. 343-345, Robert Bosch GmbH.

"Automotive Fuel Lines," Verlag Moderne Industie, 1998, p. 4.

* cited by examiner

FILTER CANISTER FAMILY

BACKGROUND

The present invention relates to a fuel vapor filter canister for capturing evaporative emissions from fuel tanks or engine components.

Internal combustion engines are often used to power small equipment such as lawnmowers, tillers, snow throwers, lawn tractors and the like. Typically, these engines include a fuel system that supplies fuel for combustion. The fuel system includes a tank, in which fuel is stored for use. Generally, the volatility of the fuel allows a portion of the fuel to evaporate and mix with air within the tank. Changes in temperature, such as those between evening and daytime, as well as sloshing during use can cause an increase or a decrease in the amount of fuel vapor in the tank as well as an increase or a decrease in the pressure within the tank.

To accommodate these pressure changes, fuel tanks often include a vent such as a vented fuel cap. The vent allows the excess air and fuel vapor to escape the tank when the pressure increases. However, the escape of fuel vapor can reduce the fuel efficiency of the engine. The vent also allows air to enter the tank when the pressure drops. Pressure within the fuel tank typically drops as fuel is drawn from the tank for use.

SUMMARY

The present invention relates to a family of carbon canisters where the ports and some of the components are similarly sized throughout the family, while the canister housing itself varies in size (i.e., volume) for different tank applications. The use of a family of carbon canisters reduces the cost of tooling due to the fact that various canister components are common to various sized carbon canisters from the same family or type of carbon canisters.

The invention also provides a family of carbon canisters that share some common dimensions to enable some components to be shared across members of the family, such as for example, a piston and a canister cover.

In one construction, the present invention provides a family or group of canisters that include at least two canisters that are adapted to filter a flow of fluid from a fuel tank. Each canister includes a first portion that defines both a first perimeter and a first area common to all canisters of the family. A second portion defines both a second perimeter and a second area common to all canisters of the family. A cover portion defines both a third perimeter and a third area common to all canisters of the family. A body portion cooperates with the first portion, the second portion, and the cover portion to define an interior space having a volume, a characteristic dimension, and a characteristic length. The volume of each canister of the family is different and the ratio of the characteristic length to characteristic dimension of each of the canisters is between about 1.5 and 5.

In another construction, the invention provides a family or group of canisters adapted for use with a fuel tank, an air cleaner, and an air-fuel mixing device. The family of canisters includes a first canister including a first vent portion, a first purge/tank portion, a first cover portion, and a first body portion that cooperate to define a first interior space having a first volume, a first characteristic dimension, and a first characteristic length. A second canister includes a second vent portion substantially the same as the first vent portion, a second purge/tank portion substantially the same as the first purge/tank portion, a second cover portion substantially the same as the first cover portion, and a second body portion that cooperates with the second vent portion, the second purge/tank portion, and the second cover portion to define a second interior space having a second volume different from the first volume, a second characteristic dimension, and a second characteristic length.

In yet another construction, the invention provides a method of designing a canister of a family of canisters that all include a common vent portion, a common purge/tank portion, and a common cover portion. The canister is adapted for use with a fuel tank. The method includes selecting a desired volume for the canister and selecting a wall that interconnects the vent portion, the purge/tank portion, and the cover portion to define an internal space having the volume, a characteristic length and a characteristic dimension. The wall selection is such that the ratio of the characteristic length to the characteristic dimension is between about 1.5 and 5.

BRIEF DESCRIPTION OF THE DRAWINGS

The detailed description particularly refers to the accompanying figures in which.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
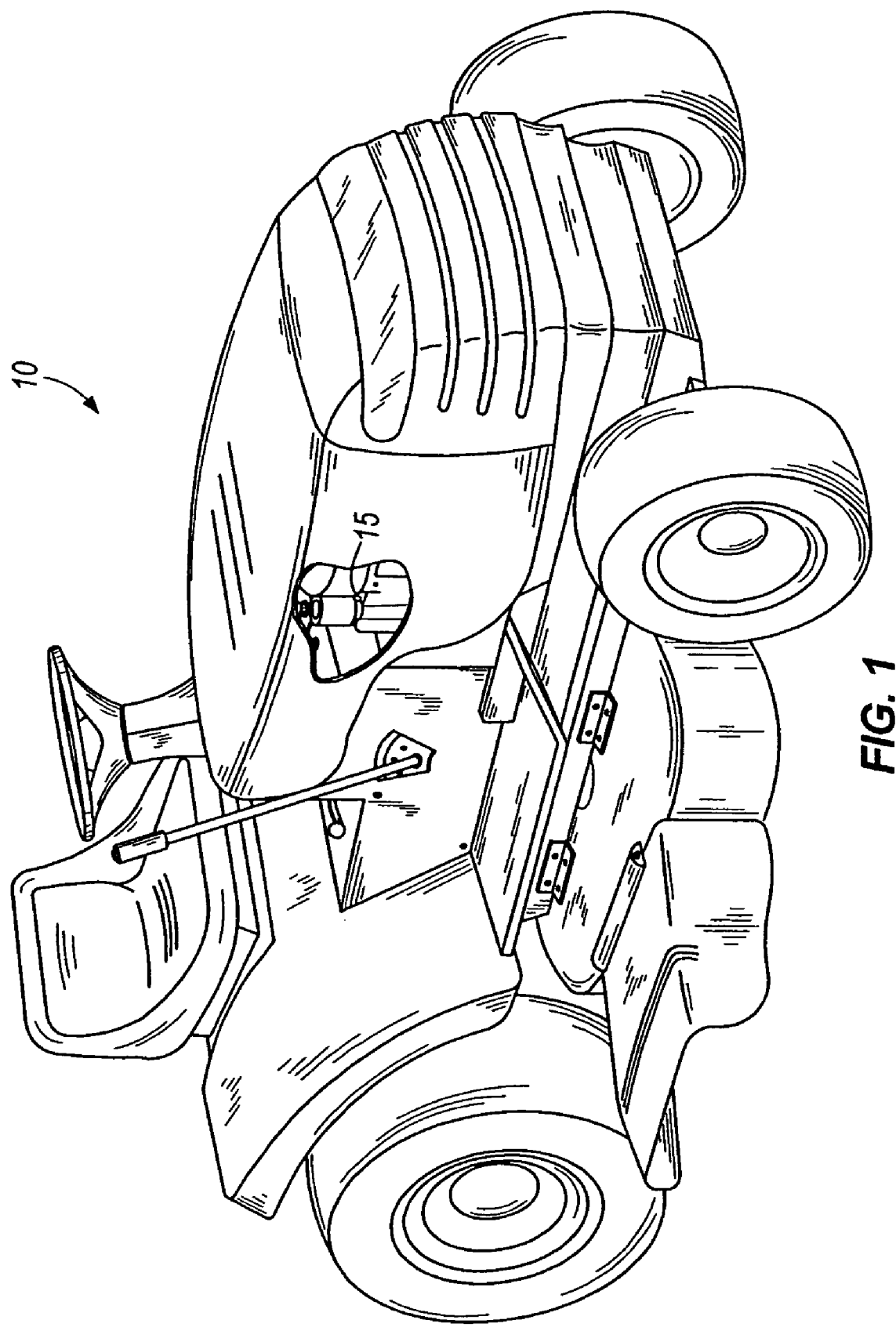
FIG. 1 is a perspective view of a lawn tractor, including an engine and a carbon canister.
Figure 7:
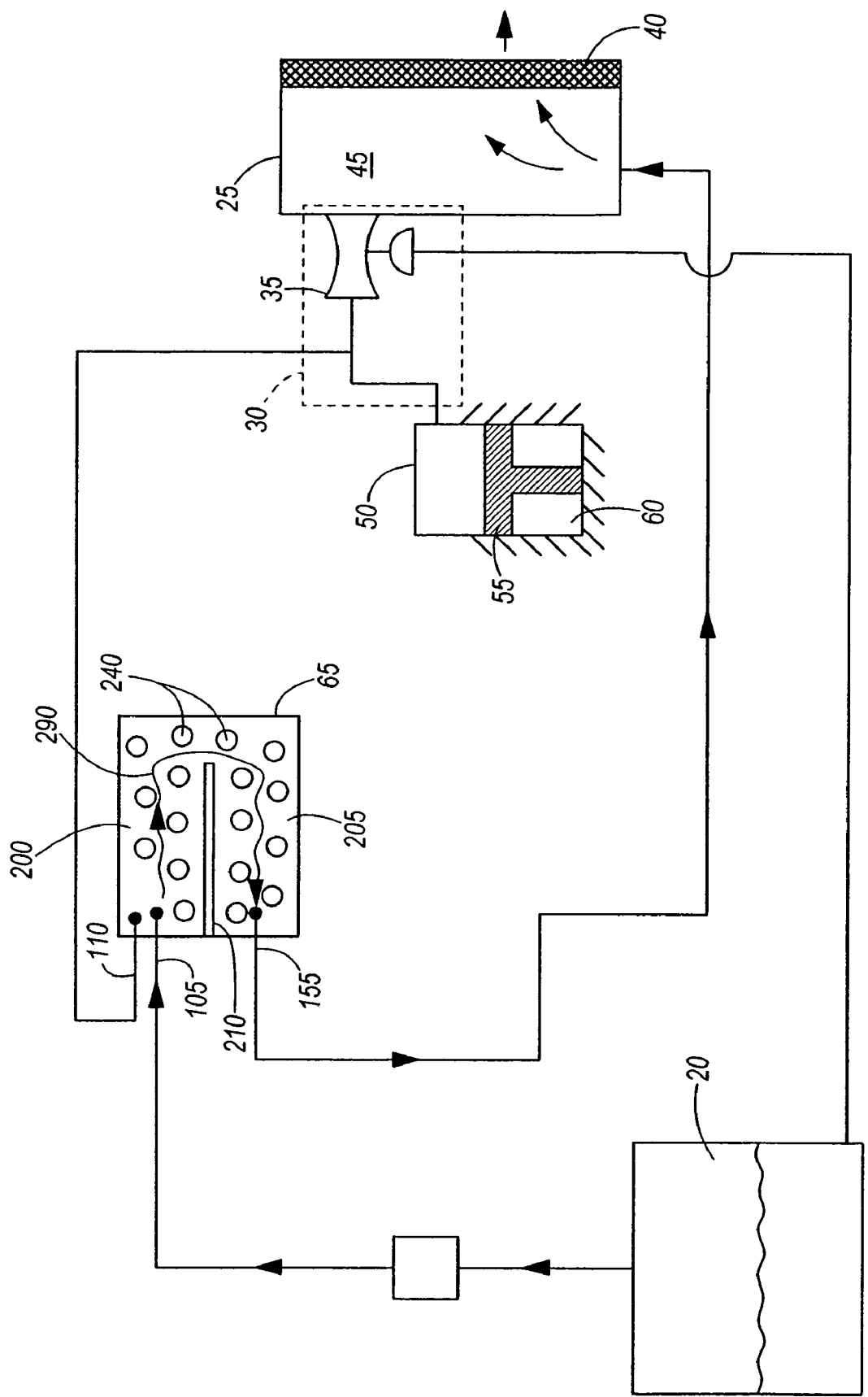
FIG. 7 is a schematic illustration of a vapor containment system, including the canister of FIG. 2, during a pressure rise within the fuel tank when the engine is not running.
Figure 8:
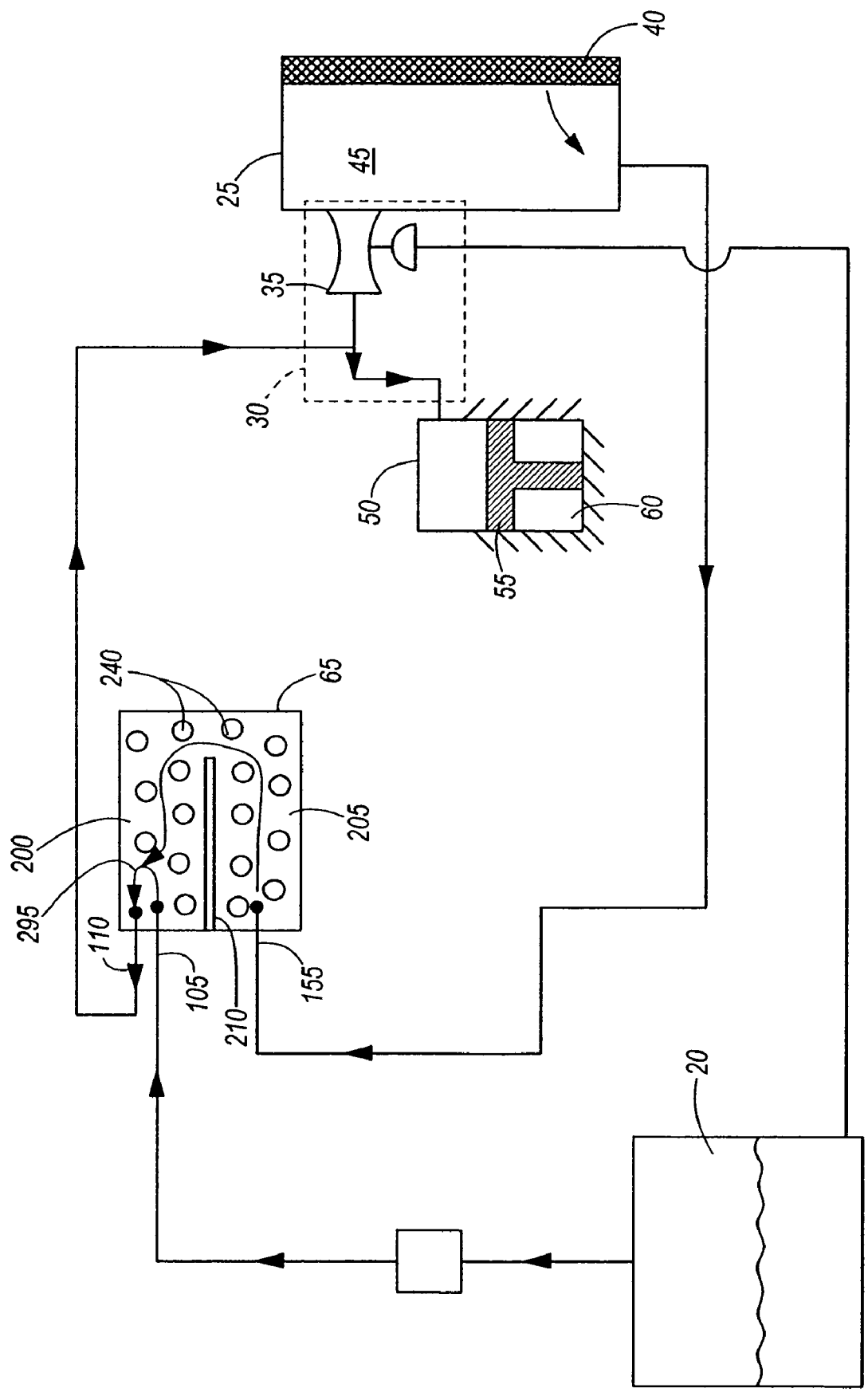
FIG. 8 is a schematic illustration of the vapor containment system of FIG. 7 during a pressure rise within the fuel tank when the engine is running.
Figure 9:
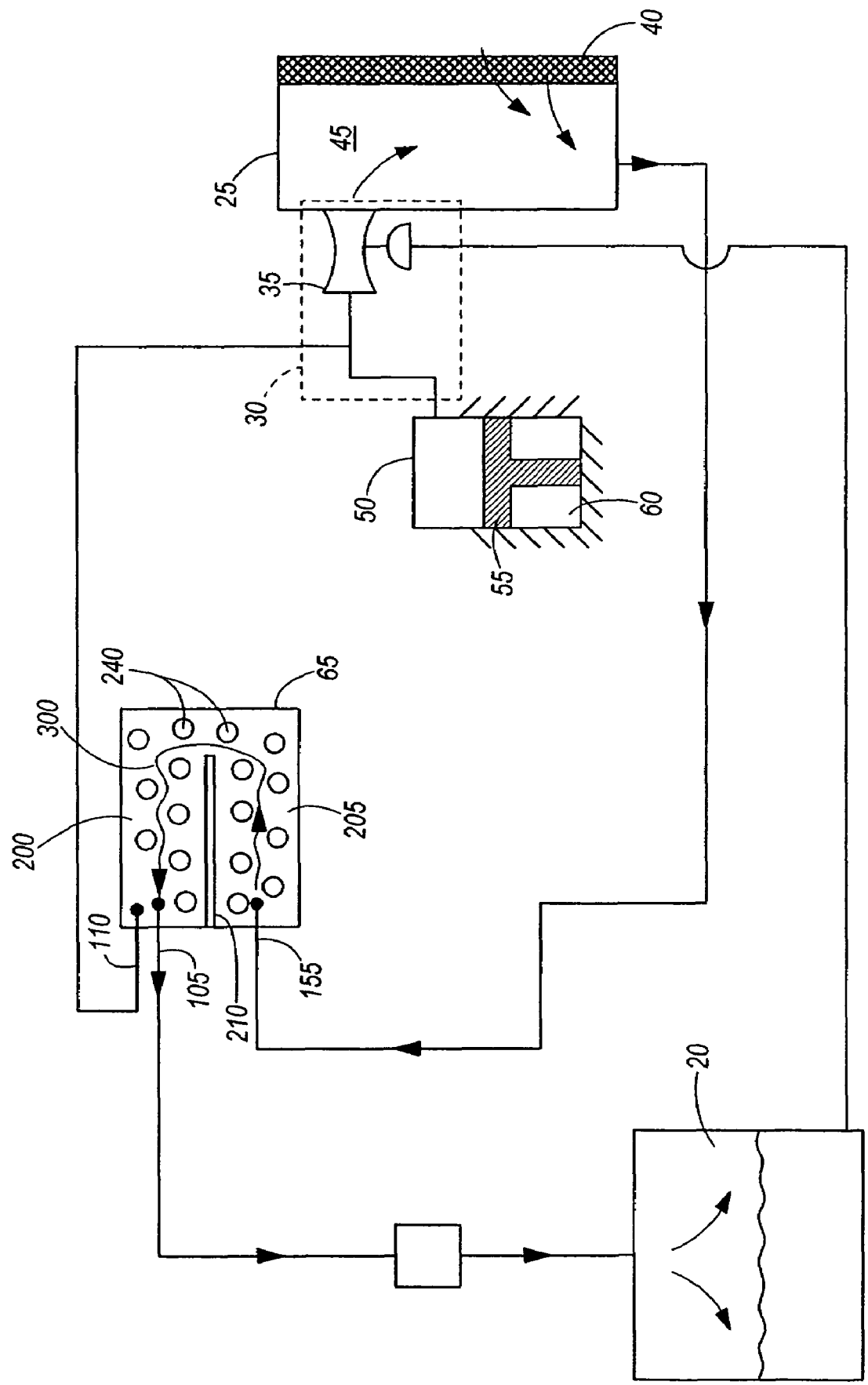
FIG. 9 is a schematic illustration of the vapor containment system of FIG. 7 during a pressure drop within the fuel tank when the engine is either running or not running.

With reference to FIG. 1, a lawn tractor 10 including an engine 15 is illustrated. To properly operate the engine 15, the lawn tractor 10 also includes a fuel tank 20, an air cleaner assembly 25, and an air-fuel mixing device 30 (shown schematically in FIGS. 7-9). Generally, the air-fuel mixing device 30 includes a carburetor 35, as illustrated in FIGS. 7-9. The engine 15 is similar to engines of a type that are often used to power small equipment such as lawnmowers, garden tractors, snow throwers, tillers, pressure washers, generators, and the like. While the engine 15 is a small engine (e.g., two or fewer cylinders), it should be understood that the invention will function with other types of engines including large internal combustion engines. It should also be understood that the invention will function without an engine, and can be used in applications including, but not limited to stationary tanks and the like.

Typically, the fuel tank 20 is sized based on the size of the engine 15 and the task to be performed by the device to which the engine 15 and the fuel tank 20 are attached. Thus, a variety of fuel tank sizes are available. For example, in one use, a two-cylinder engine is coupled to the lawn tractor 10 of FIG. 1. In this example, a two gallon fuel tank may be attached to the lawn tractor 10 to provide fuel to the engine 15. The same engine can also be attached to a snow thrower that includes a one-half gallon fuel tank. The limited space of the snow thrower and the typically shorter period-of-use as compared to a lawn tractor allows for the use of a smaller fuel tank. As one of ordinary skill in the art will realize, many size fuel tanks can be used with any given engine. As such, the invention described herein should not be limited to use with fuel tanks sized as described herein. Rather, the invention is applicable to many different fuel tanks in addition to those discussed.

The air cleaner assembly 25 receives a flow of air from the atmosphere and filters that air for delivery to the engine 15. Generally, a pleated paper filter media 40 is disposed within the air cleaner assembly 25 to filter unwanted particles from the air before the air is delivered to the air-fuel mixing device 30. Thus, the air cleaner assembly 25 defines a clean air space 45 where filtered air exits the paper filter media 40.

As discussed, the air-fuel mixing device 30 typically includes the carburetor 35 that could be a float carburetor, a diaphragm carburetor or any other type of carburetor. The air-fuel mixing device extends from the clean air space 45 to a combustion chamber 50 and operates to deliver an air-fuel mixture to the combustion chamber 50. The air-fuel mixture is combusted within the combustion chamber 50 to produce usable power. In other constructions, other air-fuel mixing systems, including fuel injection, may be employed to deliver fuel and air to the combustion chamber 50.

The engine 15 includes one or more pistons 55 (shown schematically in FIGS. 7-9) that reciprocate within one or more cylinders 60 to define one or more combustion chambers 50. A spark ignites the air-fuel mixture within the combustion chamber 50 to produce power at a crankshaft. Other types of engines (e.g., rotary engines, diesel engines, etc.) may define the combustion chamber 50 in a different manner, or may ignite the air-fuel mixture in a different manner to produce the power.

Figure 2:
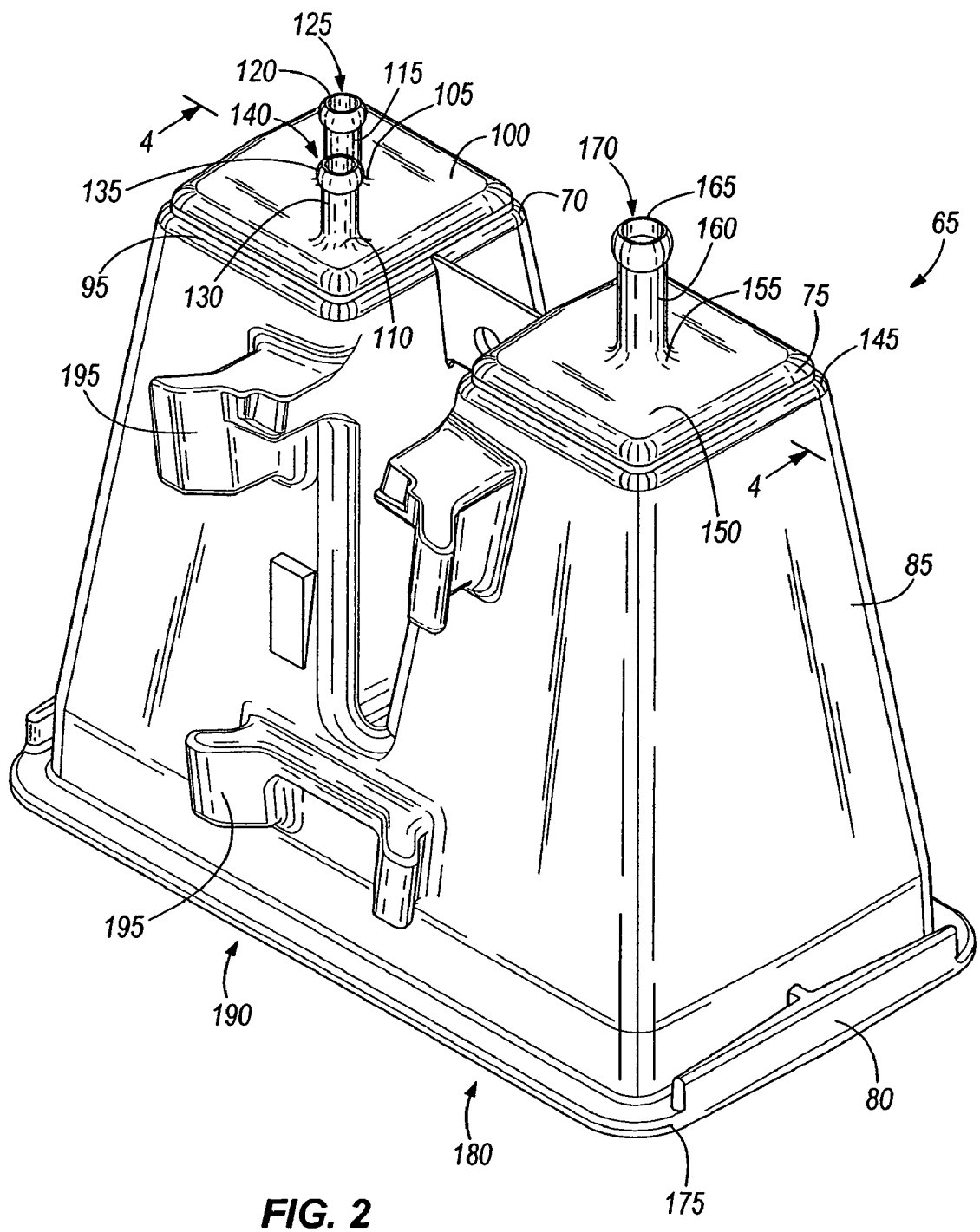
FIG. 2 is a perspective view of a carbon canister suitable for use with the lawn tractor of FIG. 1.

With reference to FIG. 2, one canister 65 of a family of canisters is shown. The canister 65 includes a first end portion 70, a second end portion 75, a cover portion 80 and a body 85. The first end portion 70, the second end portion 75, the cover portion 80 and the body 85 cooperate to substantially enclose and define a canister space 90 (shown in FIG. 3). The canister 65 is generally formed by injection-molding of a plastic material. However, the canister 65 can be formed from a plurality of materials, including, but not limited to, plastic, metal, composite, and the like. Other manufacturing processes are also available to form the canister 65, including but not limited to vacuum-forming, drawing, roto-molding, blow-molding, and the like.

The first end portion 70, sometimes referred to as a purge/tank portion, is positioned on an end of the canister 65 and includes a first perimeter 95 and a first area 100 that are common to all canisters of the family. The first area 100 is defined within the first perimeter 95. The first end portion 70 further includes a tank connector 105 and a purge connector 110. The tank connector 105 includes a substantially elongated tube portion 115 that extends from the first-end portion 70. The tube portion 115 includes an enlarged or mushroom-shaped end 120 that engages a tube or other flow-passing device to provide a fluid communication path between the tank connector 10S and the fuel tank 20. A tank aperture 125 extends through the tank connector 105 to provide fluid communication between the tube or flow-passing device and the canister space 90.

The purge connector 110 includes a substantially elongated tube portion 130 that extends from the first end portion 70. The tube portion 130 includes an enlarged or mushroom-shaped end 135 that engages a tube or other flow-passing device to provide fluid communication between the purge connector 110 and the air-fuel mixing device 30. A purge aperture 140 extends through the purge connector 110 to provide fluid communication between the tube or flow passing device and the canister space 90.

The second end portion 75 is positioned on the end of the canister 65 substantially adjacent to the first end portion 70 but separated from the first-end portion 70. The second end portion 75 includes a second perimeter 145 and a second area 150 that are common to all canisters 65 of the family. The second area 150 is defined within the second perimeter 145. The second end portion 75 further includes a vent connector 155. The vent connector 155 includes a substantially elongated tube portion 160 that extends from the second end portion 75. The tube portion 160 includes an enlarged or mushroom-shaped end 165 that engages a tube or other flow-passing device to provide fluid communication between the vent connector 155 and the air cleaner assembly 25. A vent aperture 170 extends through the vent connector 155 to provide fluid communication between the tube or flow-passing device and the canister space 90.

While the first end portion 70 and second end portion 75 have been illustrated as being substantially rectangular or square, other constructions may use different shapes (e.g., polygons, ovals, circles, irregular shapes, and the like) to define one or both of the end portions. For example, another construction employs a round cross section. Thus, the invention should not be limited to rectangular or polygonal cross sections alone.

Additionally, the constructions discussed herein describe tube portions 115, 130, 160 that include mushroom-shaped ends 120, 135, 165 that engage tubes. However, other constructions may use other arrangements such as barbs to engage the tubes. In still other constructions, clamps may be employed to enhance the engagement between the tubes and the tube portions 115, 130, 160. In yet another construction, threaded connectors such as swaged tubes and the like are employed. As one of ordinary skill in the art will realize, many different forms of connection are suitable for use with the present invention.

The cover portion 80 is positioned on an end of the canister 65 opposite the first end portion 70 and the second end portion 75. The cover portion 80 includes a third perimeter 175 and a third area 80 that are common to all canisters 65 of the family. The third area 180 is defined within the third perimeter 175. A cover plate 185 is positioned on the cover portion 80 to cover an open end 190 of the canister 65. The cover plate 185 (shown in FIG. 3) is preferably welded or adhesively bonded to the canister 65 to close the open end. In other constructions, fasteners or other fastening means are employed to attach the cover plate 185 to the open end 190. In some embodiments, the operating orientation of the canister is such that the cover plate 185 defines the bottom of the canister 65. However, the canister 65 can be positioned in nearly any orientation without significantly affecting its ability to perform its filtering functions.

The canister body 85 defines walls between the first end portion 70, the second end portion 75 and the cover portion 80. The body 85 can be a plurality of shapes and sizes, including, but not limited to, rectangular, square, or circular. The canister body 85 can vary in dimension or shape, but the first end portion 70, the second end portion 75, and the cover portion 80 remain of constant dimension throughout the family of carbon canisters. In some embodiments, the canister body 85 also includes one, two or more connecting points 195 to couple the canister 65 within the engine system. The construction illustrated in FIG. 2 includes four extensions 195 that engage a V-shaped slot to couple the canister to another component. Of course, other attachment schemes could be employed without significantly affecting the performance of the canister.

Figure 4:
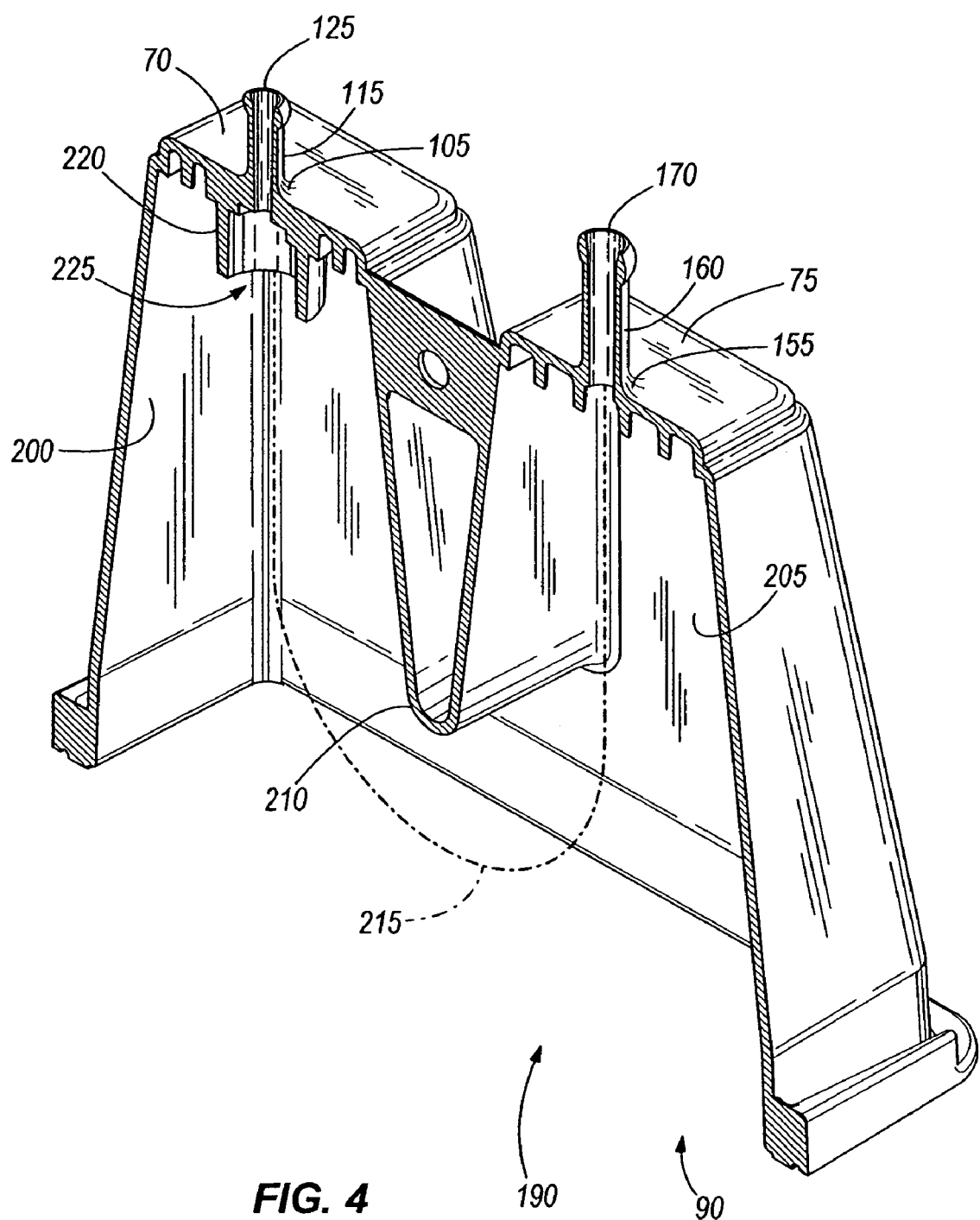
FIG. 4 is section view of a portion of the carbon canister of FIG. 2 taken along line 4-4 of FIG. 2.

With reference to FIG. 4, the canister body 85 defines a first leg 200, a second leg 205, and a central wall 210 that together define a U-shaped flow path 215. The first leg 200 extends from the first end portion 70 to the cover portion 80 and the second leg 205 extends from the second end portion 75 to the cover portion 80. The first leg 200 and second leg 205 are separated along a portion of their length by central wall 210, which is preferably formed as a portion of the canister body 85. The U-shaped flow path 215 extends within the canister space 90 between the first end portion 70 along the first leg 200 and the second end portion 75 along the second leg 205.

In the illustrated construction, the U-shaped flow path includes two legs that are substantially parallel to one another. However, other constructions may include U-shaped flow paths in which the two legs are not parallel. In still other constructions, a single substantially straight flow path extends between the first end and the second end. Thus, while a U-shaped flow path with substantially parallel legs is illustrated and such an arrangement is generally more compact than other arrangements, the invention should not be limited to this arrangement alone.

With continued reference to FIG. 4, a boss 220 extends into the canister space 90 from the first end portion 70. The boss 220 includes an aperture 225 that provides fluid communication between the tank aperture 125 and the canister space 90. The boss 220 extends into the canister space 90 a predefined height such that any flow through the tank aperture 125 exits into the canister space 90 at a depth equal to the height of the boss 220.

Figure 3:
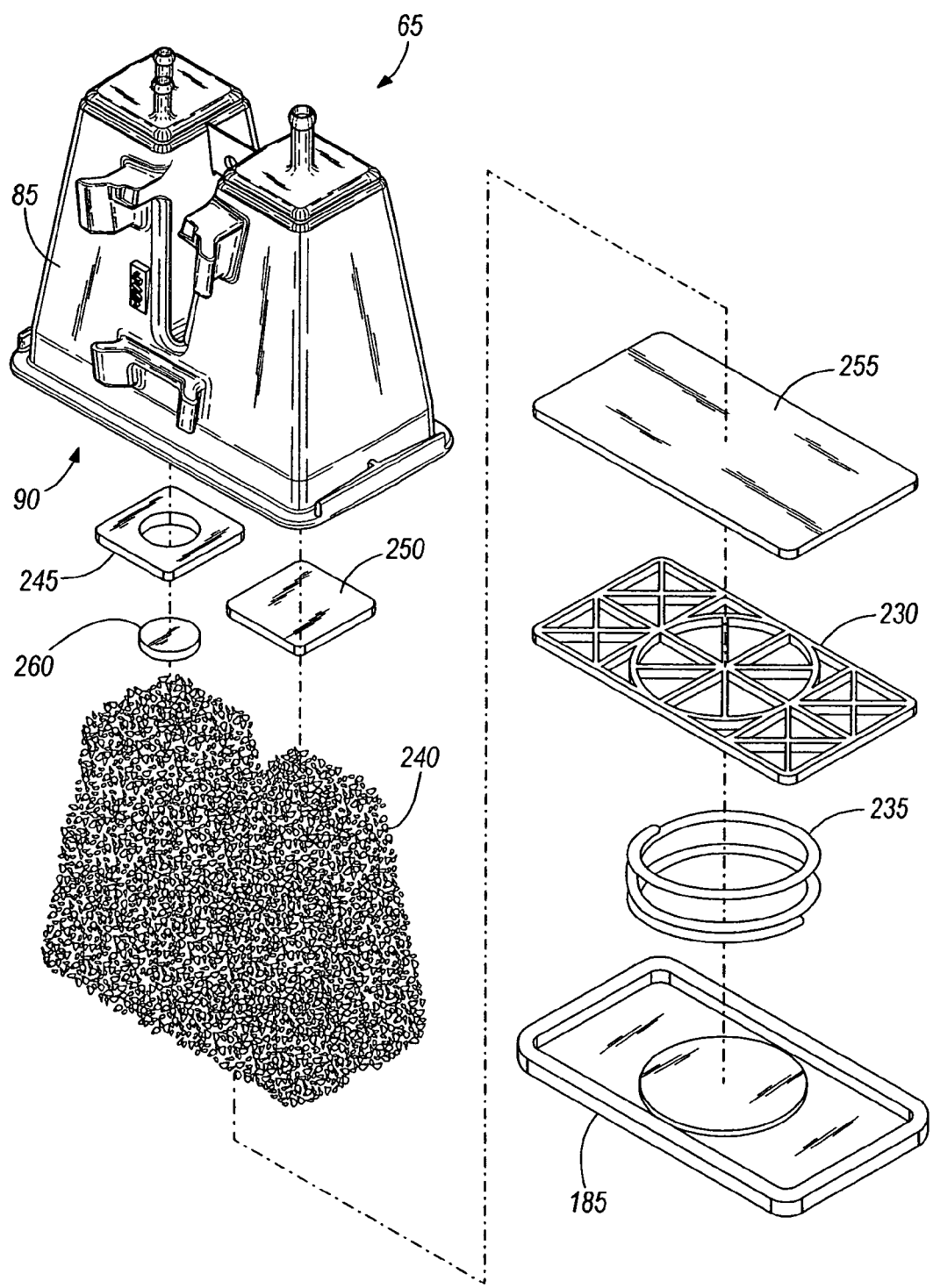
FIG. 3 is an exploded perspective view of the carbon canister of FIG. 2.

A piston 230, shown in FIG. 3, is positioned within the canister space 90 adjacent the cover 185. A biasing member 235, such as a coil spring, is positioned between the cover 185 and the piston 230. The biasing member 235 biases the piston 230 away from the cover 185. The biasing member 235 can include, but is not limited to, a coil spring, a leaf spring, a resilient material, or other similar device that biases the piston 230 away from the cover 185 within the canister space 90.

A filter media 240 suitable for use in filtering hydrocarbons is deposited within the canister space 90. The filter media 240 adsorbs hydrocarbons, such as fuel vapor, that may be entrained in the flow that passes through the U-shaped flow path 215. The filter media 240 can be in a plurality of forms. For example, one suitable filter media 240 includes charcoal, with other types of filter media 240 being suitable for use. In some embodiments, the filter media 240 may be in particulate form deposited throughout the canister space 90. Suitable filter media 240 include, but are not limited to, wood-based granular carbon, palletized carbon, particulate carbon, and the like.

A mesh media, shaped as necessary, is also utilized throughout the canister space 90. The mesh media includes a first end mesh 245, a second end mesh 250 and a cover mesh 255. The first end mesh 245 is substantially positioned within the uppermost portion of the first end portion 70. The first end mesh 245 includes a substantially circular portion 260 removed from approximately the center of the first end mesh 245. The removed circular portion 260 is positioned on the aperture 225 of the boss 220. In a preferred construction, a non-woven or spun material such as polyester is used to form the end meshes 245, 250, 260 and cover mesh 255 with other materials also being suitable for use.

The cover mesh media 255 is positioned on the piston 230 such that the piston 230 supports the cover mesh media 255. The cover mesh media 255 is biased away from the cover plate 185 by the biasing member 235. Arranged in this manner, the biasing member 235 maintains a desired level of compression on the cover mesh media 255, and more particularly the filter media 240, such that the filter media 240 in the canister space 90 can expand and contract slightly without significantly changing the resistance to flow through the filter media 240. The biasing member 235 also inhibits significant movement of the particles that define the filter media 240, thus reducing the likelihood of damage, abrasion, or wear between adjacent media particles.

Figure 5A:
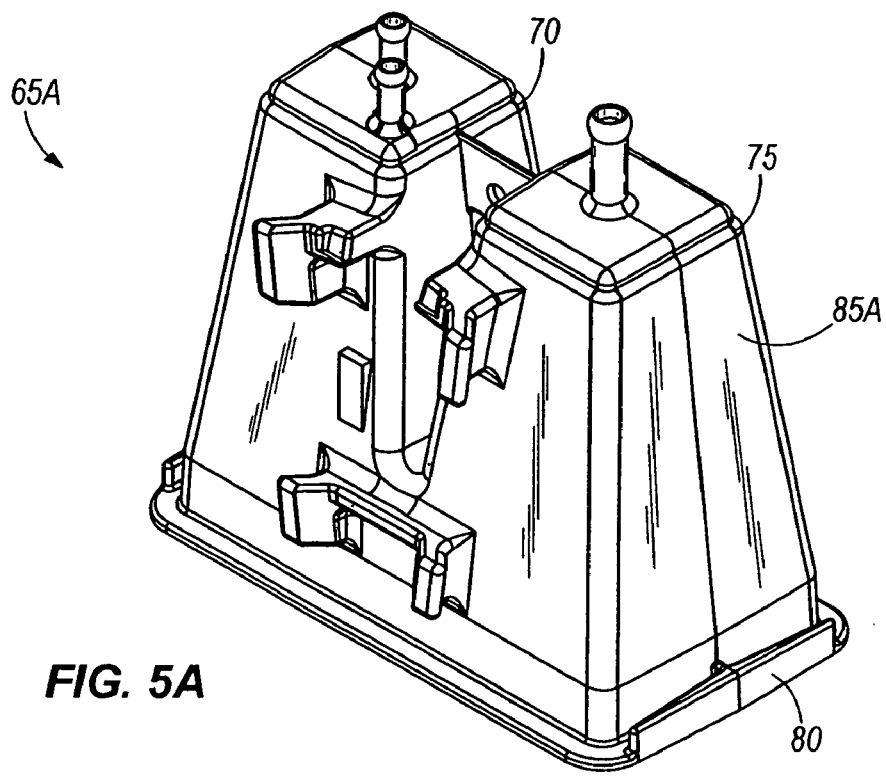
FIG. 5A is a perspective view of one of a family of carbon canisters.
Figure 5B:
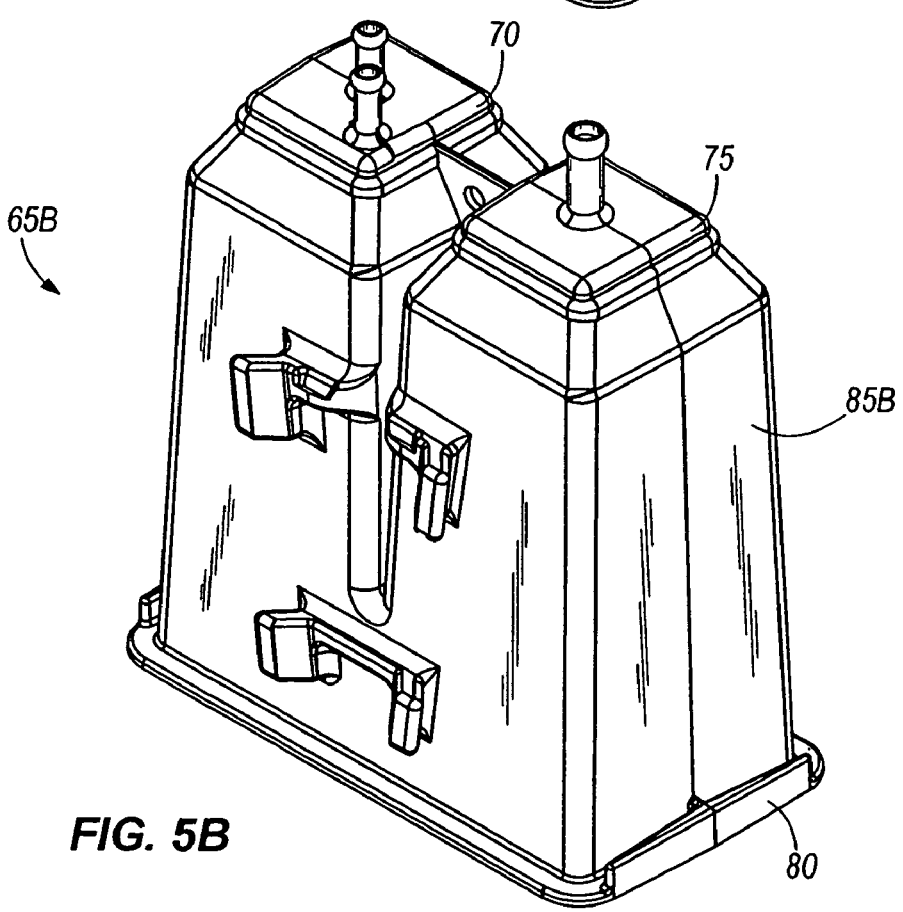
FIG. 5B is a perspective view of another canister of the family of carbon canisters of FIG. 5A.

With reference to FIGS. 5A and 5B, two canisters 65A and 65B that are part of a single family of carbon canisters are illustrated. The piston 230, cover plate 185, first end mesh 245, second end mesh 250, cover mesh 255, and circular portion 260 can be shared among canisters in the same family of carbon canisters since the first end portion 70, the second end portion 75, and the cover portion 80 are substantially identical within the same family of carbon canisters. As illustrated in FIGS. 5A and 5B, the canister body 85A, 85B of each canister 65A and 65B vary in size and shape depending on the operating requirements of the various engine applications for which the canister 65A, 65B is utilized.

Figure 6:
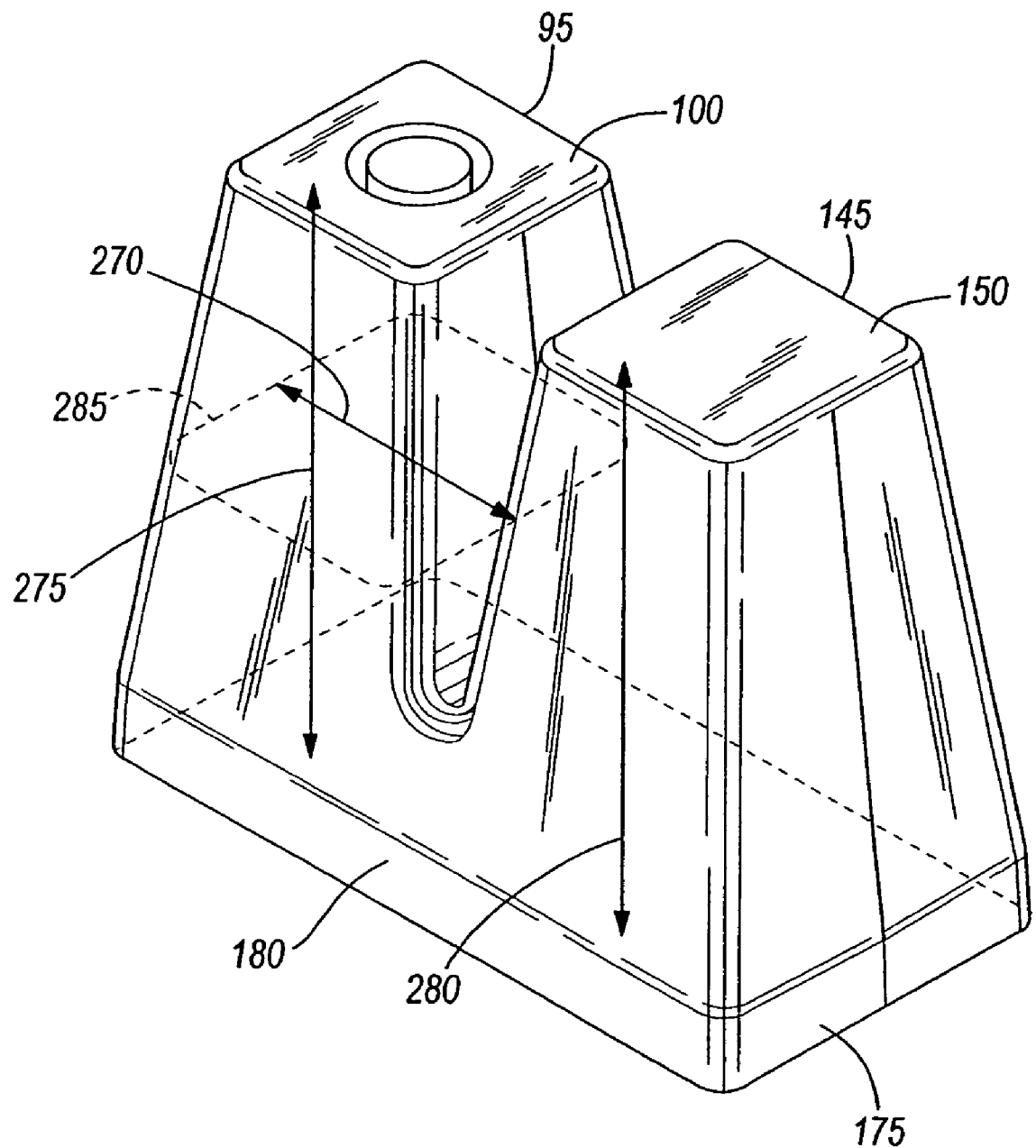
FIG. 6 is a schematic view of the carbon canister of FIG. 2.

With reference to FIG. 6, each canister within a family of carbon canisters has a ratio of a characteristic length 265 to a characteristic dimension 270 that is between about 1.5 and 5.0, and more preferably between about 2.8 and 3.2. The characteristic length 265 is defined as the sum of a first length 275 and a second length 280. The first length 275 is the measure of the shortest distance between the piston 230 and the first end portion 70. The second length 280 is the measure of the shortest distance between the piston 230 and the vent connector 155. The characteristic dimension 270 is defined as the width of a closed planar figure having the same area as the cross-sectional area 285 of the flow path taken at a location approximately mid-length of the first length 275 or the second length 280. In a preferred construction, the characteristic dimension 270 is a diameter of a circle having the same area as area 285, but it can include among other things, but is not limited to, the width of a rectangle, the diagonal of a square, and the like.

In operation, a user fills the fuel tank 20 with fuel, usually gasoline, with other fuels also being possible. The volatility of the fuel allows some fuel to evaporate and fill the empty space within the fuel tank 20 with a mixture of fuel vapor and air. Normal fluctuations in temperature (e.g., between the day and the evening), as well as fuel sloshing induced during use can cause an increase or a decrease in the amount of fuel vapor within the fuel tank 20. These increases and decreases generally result in corresponding increases or decreases in pressure within the fuel tank 20 if the fuel tank 20 is not vented.

As shown in FIGS. 7 and 8, as the pressure within the fuel tank 20 increases, a fluid made up of fuel vapor and air enters the flow path or tube that leads to the canister 65. From the canister 65, the fluid can follow two different flow paths depending on whether the engine 15 is not running as shown in FIG. 7 or the engine 15 is running as shown in FIG. 8.

As illustrated in FIG. 7, the build-up of fuel vapor in the fuel tank 20 causes increased pressure in the fuel tank 20, which causes the fuel vapor to flow into the canister 65 by way of the tank connector 105. The fuel vapor enters the boss 220 and flows through the boss aperture 235. The volatile fluid enters the canister space 90 after filtering through the circular mesh media 260. The volatile fluid flow continues through the filter media 240 disposed along the U-shaped flow path 290 within the canister 65. While flowing through the U-shaped flow path 290, at least a portion of the fuel vapor is adsorbed by the filter media 240 deposited throughout the canister space 90. Under normally expected conditions, with a canister properly sized for the fuel tank, the filter media 240 removes a substantial portion of, or all, the fuel vapor within the volatile fluid such that as the flow reaches the vent connector 155, the flow is made up almost completely of air. The air flows through the vent connector 155 to the clean air space 45 defined by the air cleaner assembly 25. From the clean air space, the air flows to the atmosphere or enters the air-fuel mixing device 30 for combustion.

Therefore, the air-fuel mixture can be cleaned by flowing through the canister 65 when the engine 15 is not running. It is desirable that the air-fuel mixture follow the U-shaped flow path 215 to allow the air-fuel mixture to pass through the entire U-shaped flow path 215 such that the filter media adsorbs most or all of the fuel vapor from the air-fuel mixture. To assure that the flow follows the proper path, the canister 65 is manufactured with the proper ratio to assure that the flow resistance does not exceed a predetermined value that is lower than the flow resistance through any alternative paths when the engine is not running.

Turning to FIG. 8, the same system is illustrated with the engine 15 running and the pressure in the fuel tank 20 rising. As with the prior condition (FIG. 7), an air-fuel mixture flows from the fuel tank to the canister. However, rather than follow the typical U-shaped flow path 215, the air-fuel mixture flows through the circular mesh media 260 coupled to the boss aperture 235 and through some filter media 240 before exiting the canister 65 by way of the purge connector 110. From the purge connector 110, the air-fuel mixture flows to the air-fuel mixing device 30 and into the combustion chamber 50 where it is combusted to produce usable shaft power. Additional air is supplied from the clean air space 45 via the vent connector 155 (see FIG. 8). This additional air purges, or restores, the adsorptive qualities of the filter media 240.

During engine operation, the purge line is maintained at a partial vacuum. The low pressure at the purge line reduces the flow resistance between the tank connector 105 and the air-fuel mixing device 30 a sufficient amount to redirect the flow to the purge connector 110 rather than around the U-shaped flow path 215 to the vent connector 155. The volatile fluid still includes fuel vapor, as the air-fuel mixture does not pass through enough of the filter media 240 to remove all of the fuel vapor. The volatile fluid, once at the air-fuel mixing device 30, is mixed with fuel and air and combusted in the engine 15. As such, fuel vapor escape to the atmosphere from the fuel tank 20 is greatly reduced or eliminated.

FIG. 9 illustrates the various flow paths when the engine 15 is either running or not running, but when the pressure is decreasing in the fuel tank 20. Tank pressure can drop for various reasons, including for example, a reduction in temperature, or as a result of the removal of fuel during engine operation. To maintain the pressure within the fuel tank 20, air or another fluid must flow into the fuel tank 20. The air enters the canister 65 by way of the vent connector 155 and flows along the U-shaped flow path 300 in a reverse direction, as compared to that of the U-shaped flow path 290 illustrated in FIG. 7. When the air enters the canister 65, the air is relatively free of fuel vapor. When the air follows the U-shaped flow path 300, the clean air de-adsorbs fuel vapor previously adsorbed by the filter media 240 to form an air-fuel vapor mixture. The air-fuel vapor mixture enters the fuel tank 20 via the tank connector 105. Thus, fuel vapor that had been adsorbed by the filter media 240 is returned to the fuel tank 20. In this manner, the filter media 240 in the canister 65 can be purged to allow for nearly continuous use during the life of the engine and in some constructions may not require periodic replacement.

The preferred use of the invention, though not the only use, is the capture and retention of evaporative emissions. The invention may also be used to capture evaporative emissions in the engine intake after the engine is shut off. In a further construction, the invention may be used with stationary tanks.

Although the invention has been described in detail with reference to certain preferred embodiments, variations and modifications exist within the scope and spirit of the invention as described and defined in the following claims.

What is claimed is:

1. A family of canisters including at least two canisters that are adapted to filter a flow of fluid from a source, each canister comprising:
    a first portion defining a first perimeter and a first area that are common to all canisters of the family;
    a second portion defining a second perimeter and a second area that are common to all canisters of the family;
    a cover portion defining a third perimeter and a third area that are common to all canisters of the family;
    a first connector coupled to the first portion and adapted to provide fluid communication between the source and the first portion; and
    a body portion cooperating with the first portion, the second portion, and the cover portion to define an interior space having a volume, a characteristic dimension, and a characteristic length, wherein the volume of each canister of the family is different and the ratio of the characteristic length to characteristic dimension of each of the canisters is between about 1.5 and 5.

2. The family of canisters of claim 1, wherein the first perimeter, the second perimeter, and the third perimeter are substantially rectangular.

3. The family of canisters of claim 1, wherein the volume contains a filter media.

4. The family of canisters of claim 3, wherein the filter media includes a fuel-vapor adsorbing media.

5. The family of canisters of claim 1, further comprising a piston common to all canisters of the family disposed adjacent the cover portion, and a biasing member common to all canisters of the family positioned to bias the piston toward the first portion.

6. The family of canisters of claim 1, further comprising a first aperture defined as part of the first portion and a second aperture defined as part of the second portion, and wherein each canister of the family of canisters defines a flow path between the first aperture and the second aperture.

7. The family of canisters of claim 6, further comprising a third aperture formed as part of the second portion such that the third aperture is in fluid communication with the first aperture.

8. The family of canisters of claim 6, wherein the flow path is substantially U-shaped and has a first leg and a second leg.

9. The family of canisters of claim 8, wherein the characteristic dimension is approximately equal to the diameter of a circle having the same area as the first leg at a location about half way between the first portion and the cover portion.

10. The family of canisters of claim 1, wherein the characteristic length is approximately one-half the sum of the distance between the first portion and the cover portion and the distance between the second portion and the cover portion.

11. The family of canisters of claim 1, wherein the ratio of the characteristic length to characteristic dimension of each of the canisters is between about 2.8 and 3.2.

12. A family of canisters adapted for use with a fuel tank, the family of canisters comprising:
a first canister including a first vent portion, a first purge/tank portion, a first cover portion, and a first body portion that cooperate to define a first interior space having a first volume, a first characteristic dimension, and a first characteristic length; and
a second canister including a second vent portion substantially the same as the first vent portion, a second purge/tank portion substantially the same as the first purge/tank portion, a second cover portion substantially the same as the first cover portion, and a second body portion that cooperates with the second vent portion, the second purge/tank portion, and the second cover portion to define a second interior space having a second volume different from the first volume, a second characteristic dimension, and a second characteristic length.

13. The family of canisters of claim 12, wherein the first vent portion, the first purge/tank portion, and the first cover portion are substantially rectangular.

14. The family of canisters of claim 12, wherein the first interior space and the second interior space are in fluid communication with the fuel tank.

15. The family of canisters of claim 12, wherein the first interior space and the second interior space contain a filter media.

16. The family of canisters of claim 15, wherein the filter media includes a fuel-vapor adsorbing media.

17. The family of canisters of claim 12, further comprising a first piston disposed adjacent the first cover portion, a first biasing member positioned to bias the first piston toward the first vent portion, a second piston substantially the same as the first piston disposed adjacent the second cover portion, and a second biasing member substantially the same as the first biasing member and positioned to bias the second piston toward the second vent portion.

18. The family of canisters of claim 12, wherein the first canister defines a first flow path that extends between the first vent portion and the first purge/tank portion, and wherein the second canister defines a second flow path that extends between the second vent portion and the second purge/tank portion.

19. The family of canisters of claim 18, wherein the first flow path and the second flow path are substantially U-shaped, and each flow path has a respective first leg and a second leg.

20. The family of canisters of claim 19, wherein the first characteristic length is approximately one-half the sum of the distance between the first vent portion and the first cover portion and the distance between the first purge/tank portion and the first cover portion.

21. The family of canisters of claim 20, wherein the first characteristic dimension is approximately equal to the diameter of a circle having the same area as the first leg at a location about half way between the first vent portion and the first cover portion.

22. The family of canisters of claim 12, wherein the ratio of the first characteristic length to the first characteristic dimension and the ratio of the second characteristic length to the second characteristic dimension is between about 1.5 and 5.

23. The family of canisters of claim 12, wherein the ratio of the first characteristic length to the first characteristic dimension and the ratio of the second characteristic length to the second characteristic dimension is between about 2.8 and 3.2.

24. A method of designing a canister of a family of canisters that all include a common vent portion, a common purge/tank portion, and a common cover portion, the canister adapted for use with a fuel tank, the method comprising:
selecting a desired volume for the canister; and
selecting a wall that interconnects the vent portion, the purge/tank portion, and the cover portion to define an internal space having the volume, a characteristic length and a characteristic dimension, wherein the wall selection is such that the ratio of the characteristic length to the characteristic dimension is between about 1.5 and 5.

25. The method of claim 24, further comprising determining a volume of the fuel tank and selecting the desired volume for the canister at least partially based on the volume of the fuel tank.

26. The method of claim 24, arranging the wall, the vent portion and the purge/tank portion to define a U-shaped flow path that includes a first leg that extends between the vent portion and the cover portion and a second leg that extends between the purge/tank portion and the cover portion.

27. The method of claim 26, wherein the characteristic length is approximately one-half the sum of a length of the first leg and a length of the second leg.

28. The method of claim 27, wherein the characteristic dimension is approximately equal to the diameter of a circle having the same area as the first leg at a location about half way between the vent portion and the cover portion.

29. The method claim 24, wherein the ratio of the characteristic length to characteristic dimension is between about 2.8 and 3.2.

* * * * *